US006777072B2

(12) United States Patent
Mueller et al.

(10) Patent No.: US 6,777,072 B2
(45) Date of Patent: Aug. 17, 2004

(54) MAGNETIC RECORDING MEDIUM

(75) Inventors: Stefan Mueller, Willstätt-Sand (DE); Johannes Sandrock, Willstätt-Echartsweir (DE); Andrea Sturm, Willstätt (DE); Wolfgang Goede, Oberachern (DE); Albert Kohl, Laumersheim (DE); Benedikt Raether, Limbergerhof (DE)

(73) Assignee: Emtec Magnetics GmbH, Ludwigshafen (DE)

( * ) Notice: Subject to any disclaimer, the term of this patent is extended or adjusted under 35 U.S.C. 154(b) by 65 days.

(21) Appl. No.: 10/200,406

(22) Filed: Jul. 23, 2002

(65) Prior Publication Data

US 2003/0031896 A1 Feb. 13, 2003

(30) Foreign Application Priority Data

Jul. 24, 2001 (DE) .......................................... 101 35 957

(51) Int. Cl.$^7$ ................................................ G11B 5/71
(52) U.S. Cl. ................................ 428/323; 428/694 BS; 428/694 BU; 428/694 BP
(58) Field of Search .......................... 428/323, 694 BS, 428/694 BU, 694 BP

(56) References Cited

U.S. PATENT DOCUMENTS

| | | | |
|---|---|---|---|
| 4,329,241 A | 5/1982 | Massart | |
| 4,383,000 A | 5/1983 | Fujiki | |
| 5,178,935 A | 1/1993 | Saito et al. | |
| 5,232,892 A | 8/1993 | Chang et al. | |
| 5,601,647 A | 2/1997 | Pertzsch et al. | |
| 5,704,978 A | 1/1998 | Maniwa et al. | |
| 5,858,097 A | 1/1999 | Richter et al. | |
| 6,037,037 A | 3/2000 | Kubota et al. | |
| 6,291,052 B1 * | 9/2001 | Takahashi et al. | 428/141 |
| 2001/0038928 A1 | 11/2001 | Nakamigawa et al. | |
| 2002/0009617 A1 | 1/2002 | Jakusch et al. | |
| 2002/0146593 A1 | 10/2002 | Suzuki et al. | |

FOREIGN PATENT DOCUMENTS

| | | |
|---|---|---|
| CA | 1066483 | 11/1979 |
| DE | 2642383 | 3/1977 |
| DE | 3027012 | 2/1981 |
| DE | 3100686 | 11/1981 |
| DE | 3933977 | 4/1990 |
| DE | 4427821 | 2/1996 |
| DE | 19504930 | 8/1996 |
| DE | 10017490 | 10/2001 |
| EP | 0520155 | 12/1992 |
| EP | 0530963 | 3/1993 |
| EP | 0654165 | 5/1995 |
| EP | 0962919 | 12/1999 |
| FR | 2734500 | 11/1996 |

OTHER PUBLICATIONS

DIN 53765, Mar. 1994, pp. 1–12.
Von Dr. Albrecht Zosel, "Methoden der Kunststoffphysik in der Lackprüfung" *Farbe und Lack*, vol. 82, No. 2, pp. 125–134 (1976).
English Language Abstract of EP 0 654 165.
English Language Abstract of DE 30 27 012.
English Language Abstract of DE 44 27 821.
English Language Abstract of DE 100 17 490.
English Language Abstract of DE 195 04 930.
English Language Abstract of FR 2 734 500.
English Language Abstract of JP 57–175734.
"Ullmann's Encyclopedia of Industrial Chemistry: Fifth, Completely Revised Edition, vol. A21: Plastics, Properties and Testing to Polyvinyl Compounds", pp. 169.

* cited by examiner

*Primary Examiner*—Stevan A. Resan
(74) *Attorney, Agent, or Firm*—Greenblum & Bernstein, P.L.C.

(57) ABSTRACT

Magnetic recording medium including a substrate, at least one lower layer which is applied thereon and contains at least one binder and at least one inorganic pigment, and at least one upper magnetic layer which is applied to the lower layer and contains at least one magnetic pigment P2 and at least one binder and at least one further, nonmagnetic pigment P3, the binder matrix of the upper magnetic layer having a Tg of at least 50° C. and the binder matrix of the lower layer containing at least one binder having a Tg of <50° C., the further nonmagnetic pigment P3 of the upper magnetic layer having a particle size which corresponds at least to the dry thickness of the upper magnetic layer; and the upper magnetic layer containing at least one compound (A) and at least one compound (B), (A) and (B) corresponding to the following formulae $$R^1\text{—COO—}(R^3\text{—O})_m\text{—}R^2 \qquad (A)$$

$$R^1\text{—COO—}R^4 \qquad (B)$$

and processes for their production.

31 Claims, No Drawings

MAGNETIC RECORDING MEDIUM

CROSS-REFERENCE TO RELATED APPLICATIONS

The present application claims priority under 35 U.S.C. §119 of German Patent Application No. 101 35 957.8, filed Jul. 24, 2001, the disclosure of which is expressly incorporated by reference herein in its entirety.

BACKGROUND OF THE INVENTION

1. Field of the Invention

The present invention relates to a magnetic recording medium comprising a nonmagnetic substrate and a lower layer which is applied thereon and contains at least one inorganic pigment and at least one binder, and a magnetic layer which is applied on the layer and contains a magnetic pigment, at least one binder and a lubricant and at least one nonmagnetic pigment.

2. Discussion of Background Information

Modern magnetic recording media will meet the steadily growing requirements only when they permit larger storage capacities, shorter access time and higher transmission rates of the stored information. These recording media must have a composition such that magnetic pigments have a sufficiently high density in the recording layer in order to ensure high storage capacities, but the magnetic layer thickness must be very small in order to permit direct overwriting of the data on rerecording without a prior erasing process. For example, magnetic recording media having a high storage capacity today have magnetic layer thicknesses of only less than about 1 $\mu$m.

There are substantially two different methods for producing a magnetic recording medium for a high recording density. According to the first method, a magnetic metal or a magnetic metal alloy is applied to a substrate under greatly reduced pressure in order to thereby produce a magnetic metal film having a very small thickness. Such recording media have good recording properties, in particular a very high recording density, but can be produced only in a small amount since the application of the magnetic layer under reduced pressure constitutes a very complicated process. Moreover, since the magnetic metal pigment is present in unprotected form, such recording media tend to oxidize very easily, which has a very adverse effect on the long-term stability.

There are magnetic recording media in which the magnetic metal pigment is embedded in a binder matrix and is applied to a nonmagnetic substrate in a coating apparatus. In order to achieve a high sensitivity here too, the thickness of the magnetic layer must be kept very small. However, this gives rise to problems owing to the roughness of the magnetic layer, and consequently leads to poor stability of such magnetic layers. In order to overcome this obvious disadvantage, a nonmagnetic layer is initially applied to the nonmagnetic substrate and it is only on the nonmagnetic layer that a very thin magnetic layer is applied. The nonmagnetic layer acts as a buffer layer into which the upper thin magnetic layer can partly penetrate, it being possible for problems due to surface roughness to be substantially avoided. Such magnetic recording media are described, for example, in EP-A-0 520 155, which is incorporated by reference herein in its entirety.

A recording medium of the type stated at the outset is disclosed in U.S. Pat. No. 6,037,037, which is incorporated by reference herein in its entirety. It has, in the lower layer, an acicular pigment having a needle length of from 0.25 to 1 $\mu$m. In the upper magnetic layer, a binder having a low Tg of 30° C. and one having a higher Tg of 70° C. are used. Such a medium has too high a surface roughness for high-density recordings, owing to the coarse-particled pigment in the lower layer, and an insufficient freeze-frame time because of the admixing of a relatively soft binder in the upper layer.

A recording medium which permits a high recording density is also required to have the following properties in addition to good electromagnetic properties:

A. The frictional contact between head and tape surface must be kept to a minimum, something which most manufacturers of magnetic recording media attempt to achieve by adding lubricants to the upper and the lower layer.

B. The magnetic recording medium may cause only slight wear of the heads, which is limited by a specification. This requirement can be met, for example, if the upper layer contains a very soft binder in which hard nonmagnetic pigments are incorporated.

C. Even during prolonged operation, the magnetic recording medium should exhibit no significant abrasion, which can cause the head surface to stick. This requirement also applies in the case of extreme climatic conditions, for example in a very humid or very dry climate or at relatively high temperatures. The last-mentioned requirement is met if the upper layer has a very hard surface, which however entails the risk of embrittlement of the layer.

From the above, it is evident that, in particular, the requirements B and C may contradict one another. In order to comply with both requirements, neither abrasion nor wear of the head can be optimally established, with the result that the quality of the magnetic recording medium is adversely affected.

SUMMARY OF THE INVENTION

The present invention relates to magnetic recording medium of the type stated at the outset, in which the friction between tape surface and head is greatly reduced and which at the same time causes only slight wear of the head. In particular, only very slight or no deposits should occur on the head in a dry climate and at relatively high temperatures. Moreover, such a magnetic recording medium should have a very thin upper magnetic layer in order to have good recording and playback properties. Moreover, the recording medium should be capable of being produced simply and in large quantities.

The present invention provides a magnetic recording medium comprising a) a substrate, b) at least one lower layer which is applied thereon, and contains at least one binder and at least one inorganic pigment, and c) at least one upper magnetic layer which is applied on the lower layer and contains at least one magnetic pigment P2 and at least one binder and at least one further, nonmagnetic pigment P3, (1) the binder matrix of the upper magnetic layer having a Tg of at least 50° C. and the binder matrix of the lower layer containing at least one binder having a Tg<50° C. and hence determining the viscoelastic properties of the composite comprising magnetic and nonmagnetic layers;

(2) the further nonmagnetic pigment P3 of the upper magnetic layer having a particle size which corresponds at least to the dry thickness of the upper magnetic layer; and
(3) the upper magnetic layer containing at least one compound (A) and at least one compound (B), (A) corresponding to the following formula

$$R^1\text{---COO---}(R^3\text{---O})_m\text{---}R^2 \quad (A)$$

where
$R^1$ is a saturated or mono-or polyunsaturated, straight-chain or branched hydrocarbon radical of 11 to 22 carbon atoms;
$R^2$ is a saturated or mono-or polyunsaturated, straight-chain or branched hydrocarbon radical of 1 to 6 carbon atoms;
$R^3$ is a straight-chain or branched alkylene radical of 1 to 4 carbon atoms; and
m is an integer from 1 to 4;
and (B) corresponding to the following formula:

$$R^1\text{---COO---}R^4 \quad (B)$$

where
$R^1$ is as defined above and
$R^4$ is a saturated or mono-or polyunsaturated, straight-chain or branched hyrocarbon radical of 4 to 8 carbon atoms.

In other words, the present invention is directed to a magnetic recording medium comprising:
a) a substrate,
b) at least one lower layer on said substrate, said at least one lower layer containing at least one binder in a binder matrix and at least one inorganic pigment, and
c) at least one upper magnetic layer on said at least one lower layer, said at least one upper layer containing at least one magnetic pigment P2 and at least one binder in a binder matrix and at least one nonmagnetic pigment P3,
(1) the binder matrix of the at least one upper magnetic layer having a Tg of at least 50° C. and the binder matrix of the at least one lower layer containing at least one binder having a Tg<50° C.;
(2) the at least one nonmagnetic pigment P3 of the at least one upper magnetic layer having a particle size which corresponds at least to the dry thickness of the upper magnetic layer; and
(3) the upper magnetic layer containing at least one compound (A) and at least one compound (B).

The at least one lower layer can contain at least one compound (A) and at least one compound (B).

The binder matrix of the at least one upper layer can contain at least one binder having a Tg of at least 50° C., which comprises at least one of vinyl copolymers, phenol resins, acrylates, epoxy resins, cellulose resins, polyesters and polyurethanes.

The binder matrix of the at least one upper layer can contain at least one binder having a Tg of at least 50° C., which comprises at least one of vinyl copolymers, phenol resins, acrylates, epoxy resins, cellulose resins, polyesters and polyurethanes.

The binder matrix of the at least one lower layer can contain at least one binder having a Tg of less than 50° C., which comprises at least one of polyurethanes, rubbers, vinyl polymers, phenol resins, acrylates, epoxy resins, cellulose resins, and polyesters.

The at least one binder of the at least one upper layer and/or the at least one lower layer can contain polar groups.

The binder matrix of the at least one lower layer can further comprise at least one binder having a Tg of at least 50° C., which comprises at least one of vinyl copolymers, phenol resins, acrylates, epoxy resins, cellulose resins, polyesters and polyurethanes.

The compounds (A) and (B) in the at least one upper layer can be contained in an amount in the range from about 0.2 to 10% by weight, based on the magnetic pigment.

The weight ratio of compound (A) to compound (B) in the at least one upper layer can be in the range from 20:80 to 80:20.

The at least one lower layer can contain at least one pigment having a BET value of at least 40 m²/g.

The at least one upper layer can further comprise a nonmagnetic pigment P4 having a particle size which is smaller than the dry thickness of the at least one lower layer.

The nonmagnetic pigments P3 and P4 of the at least one upper layer can comprise of at least one of metal oxides, metal carbonates, metal sulfates, metal nitrides, metal carbides and metal sulfides.

At least one of the pigment P3 and the pigment P4 can be an $Al_2O_3$.

The pigment P3 having a larger particle size and the pigment P4 having a smaller particle size can be contained in a weight ratio of pigment P3 to pigment P4 of from 80:20 to 20:80.

The at least one inorganic pigment of the at least one lower layer can comprise at least one of metal oxides and carbon blacks.

The at least one magnetic pigment P2 in the at least one upper layer can be a metal powder or an alloy powder having a coercive force of at least 100 kA/m.

The at least one magnetic pigment P2 of the upper layer can be a highly coercive ferrite. The ferrite can be barium ferrite.

The at least one inorganic pigment in the lower layer can comprise at least one of at least one nonmagnetic pigment P1 and at least one magnetically soft pigment P5 having a coercive force of less than 0.7 kA/m.

The compound (A) can comprise butoxyethoxyethyl stearate. The compound (B) can comprise isobutyl stearate.

The invention is also directed to processes for production of a magnetic recording medium, such as wherein the at least one upper layer is applied to an already dry at least one lower layer present on the substrate; or the at least one upper layer is applied to a wet at least one lower layer present on the substrate, or wherein both layers are applied simultaneously to the substrate. The medium can be dried after application of the at least one upper magnetic layer and is then subjected to a calendering process with the use of pressure, and optionally an elevated temperature.

DETAILED DESCRIPTION OF THE PREFERRED EMBODIMENTS

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

In a first preferred embodiment of the invention, a magnetic, preferably tape-like recording medium of the type described above is provided, wherein the compounds (A) and (B) used as lubricants fulfill in particular the following conditions:

In the above compounds (A) and (B), $R^1$ is preferably a saturated, straight-chain alkyl radical of 11 to 22, preferably 11 to 18, carbon atoms. Nonlimiting examples are lauryl, myristyl, palmityl and stearyl radicals.

$R^2$ is preferably a saturated, straight-chain or branched hydrocarbon radical of 1 to 6, preferably 1 to 4, carbon atoms. Nonlimiting examples are methyl, ethyl, isopropyl, n-propyl, n-butyl, isobutyl, sec-butyl, tert-butyl, n-pentyl and isopentyl; and furthermore n-hexyl.

$R^3$ is preferably a straight-chain or branched alkylene radical of 1 to 4 carbon atoms. Nonlimiting examples of these are methylene, 1,2-ethylene, 1,3-and 1,2-propylene and 1,4- and 1,3-butylene.

$R^4$ is preferably a saturated, straight-chain or branched hydrocarbon radical of 4 to 8 carbon atoms. Nonlimiting examples of these are isobutyl, sec-butyl, tert-butyl, n-pentyl and isopentyl; and furthermore n-hexyl, n-heptyl and n-octyl, and the singly or multiply branched analogs thereof.

$C_2$–$C_4$-Alkyldi-$C_2$–$C_4$-alkylene glycol esters of stearic, palmitic, myristic or lauric acid, in particular isobutyl or n-butyl diethylene glycol stearate, palmitate, myristate and laurate, may be mentioned as specific nonlimiting examples of compounds of the formula (A).

$C_2$–$C_4$-Alkyl esters of stearic, palmitic, myristic or lauric acid, in particular isobutyl or n-butyl stearate, palmitate, myristate and laurate, may be mentioned as specific nonlimiting examples of compounds of the formula (B).

The upper magnetic layer of the recording medium contains one or more binders comprising an upper layer binder matrix having a glass transition temperature Tg of at least 50° C. Preferably, the upper binder matrix comprises one binder. In addition to the magnetic pigment P2, this layer also contains at least one further nonmagnetic pigment P3, which has a mean particle size which is equal to or greater than the dry layer thickness of the magnetic layer and which serves as spacer, as will be described in more detail below. Furthermore, this layer can also advantageously contain a further nonmagnetic pigment P4 which has a smaller mean particle size than the layer thickness. This pigment P4 stabilizes the layer.

The lower nonmagnetic layer contains at least one binder or a binder mixture, which binder or which binder mixture is chosen so that the binder matrix of the lower layer determines the viscoelastic properties of the coating and has a not insubstantial content of at least one binder which is softer than the binder matrix of the upper layer. According to the invention, the binder used for the lower layer or the binder mixture comprises at least one binder having a Tg below about 50° C., preferably below 40° C., and above −100° C., preferably above 20° C., and even more preferably above 30° C., with the result that the lower layer is viscoelastic. By combining such a softer binder with a harder binder, having, for example, a Tg of more than about 50° C., as described above for the magnetic layer, the viscoelastic properties of the novel medium can be optimally established. The mixing ratio of harder to softer binder in the lower layer is in the range from about 80:20 to 20:80, preferably from about 60:40 to 40:60, parts by weight.

According to the invention, the glass transition temperature Tg is understood as meaning the midpoint temperature determined according to ASTM D 3418-32 by differential thermal analysis (DSC) (cf. Ullmann's Encyclopedia of Industrial Chemistry, 5th Edition, Vol. 21A, page 169, V C H Weinheim, 1992; and Zosel, Farbe und Lack 82 (1976), 125–134; and DIN 53765, which are incorporated by reference herein in their entireties).

It has also been found that a combination of two different lubricants of the formulae (A) and (B) defined above is advantageous for achieving a low coefficient of friction of the magnetic recording medium and for avoiding abrasion under extreme climatic conditions, particularly in the upper layer.

Without wishing to be bound by theory, and without limiting the present invention, a possible explanation of the surprising novel advantages achieved is that the lubricant of the formula (A), owing to its slightly hydrophilic head groups, can absorb up to 1 mol % of water, so that a higher moisture content, which cannot be achieved with purely hydrophobic lubricants, is retained at the surface of the magnetic recording medium even in a dry climate. With increasing value of the parameter m, the head group becomes increasingly hydrophilic. In this way, the formation of abraded material, in particular the brown stain, is reliably avoided even during prolonged use of the magnetic recording medium. Moreover, such amphiphilic lubricants appear to form a lipid double layer which reduces the friction between tape surface and head. The lubricant of the formula B evidently acts as a cosurfactant and stabilizes the lipid double layer.

Furthermore, according to investigations in accordance with the present invention, it has proven advantageous if at least one very finely divided pigment (such as P1 or P5) having a BET surface area of at least 60 $m^2/g$, more preferably least 80 $m^2/g$, preferably at least 100 $m^2/g$ is present in the lower, preferably nonmagnetic, layer: the layer then acts as a reservoir for the combination of the lubricants A and B. For this purpose, it is advantageous if the lower layer also contains the lubricant combination A and B.

As will be evident from the examples described below, the magnetic recording medium possessing such a composition has surprisingly low, uniform friction between head and tape surface, the abrasion of the head by the recording medium is substantially reduced and furthermore only slight formation of abraded material is observed even under extreme climatic conditions.

The composition of the magnetic recording medium is explained in more detail below.

a. The Nonmagnetic Substrate

The choice of substrate is not subject to any particular requirements. It may be rigid or flexible and may be composed of metal, glass, ceramic, carbon or a polymeric material.

Examples of organic polymers are polyesters, such as polyethylene terephthalate and naphthalate, polyolefins, cellulose derivatives, vinyl polymers or plastic materials, such as polycarbonate and polyimide. Metals which may be used are, for example, aluminum, copper, tin, zinc or nonmagnetic alloys.

In the case of organic polymeric substrates, the mean layer thickness is from 1 to 10 μm and the mean surface roughness is in the region of 25 nm or less. In order to achieve particular mechanical properties of the recording medium, a plurality of different polymers can also preferably be coextruded in one operation. If required, the polymeric substrate can be provided with a thin adhesion-promoting layer whose thickness is in general less than 1 μm. The composition of such adhesion-promoting layers is known from the prior art.

b. The Lower Nonmagnetic or Weakly Magnetic Layer Applied to the Substrate

The lower layer preferably contains at least one polymeric binder having a Tg of not more than 50° C., preferably not more than 45° C. and more preferably not more than 40° C. The lower limit for the Tg is −100° C., preferably +30° C. However, the layer may also contain further binders having a higher Tg than that stated above. Binders having a higher Tg are, for example, the binders which can be used for the production of the magnetic layer (cf. following section c)).

Examples of binders having a Tg of less than 50° C. are in particular polyurethanes having ester or ether or carbonate groups and various rubbers. Preferably, the binders for the lower layer contain polar groups in order to increase the dispersing power of the binders for the further additives, in particular the pigments. Examples of such polar groups are —COOM, —SO$_3$M, O—SO$_3$M, —P(OM)$_2$, amino groups, ammonium groups, OH groups, SH groups and epoxy groups. In the polar groups, M is a hydrogen or alkali metal atom, in particular Na or K, or ammonium.

The lower layer can contain, as a further additive, at least one finely divided nonmagnetic pigment P1, one of which preferably has a BET value which is at least 40 m$^2$/g, for example, at least 55 m$^2$/g, 60 m$^2$/g, 80 m$^2$/g or at least 100 m$^2$/g. Examples such nonmagnetic pigments are carbon black whose mean particle size may vary within wide ranges, for example from 0.015 to 1 μm. The specific surface area of the carbon black is in general from 20 to 300 m$^2$/g.

metal oxides, for example chromium oxide, alumina, cerium oxide, iron oxide, corundum, titanium dioxide, silica, tin oxide, magnesium oxide, tungsten oxide, zirconium oxide and zinc oxide, metal carbonates, metal sulfates, metal nitrides, metal carbides or metal sulfides. They may be provided with an inorganic or organic coating. The pigments may be acicular, cubic, spherical or tabular in shape. These pigments have a mean particle diameter in the range from 0.01 to 2 μm, for example from 0.05 to 0.2 μm. Acicular pigments preferably have a length in the range from 0.05 to 0.4 μm, for example from 0.1 to 0.15 μm, and an axial ratio (longitudinal-to-transverse) of from about 1:2 to 1:10, for example from 1:5 to 1:6. At least one of the pigments should be very finely divided, having a BET value of at least 50 m$^2$/g. Pigments have a MOHS' hardness of at least 4, preferably at least 6.

Instead of or in combination with the above nonmagnetic pigments P1, a magnetically soft pigment P5, in particular having a coercive force of less than 0.7 kA/m and a maximum specific magnetization of from about 30 to 65 emu/g, may be present in the lower layer. Regarding the finely divided character of the magnetically soft pigment, statements similar to those made for the nonmagnetic pigment described above apply; the magnetically soft pigment advantageously has a BET surface area of at least 80, preferably at least 100, m$^2$/g. The magnetically soft pigment P5 may have any desired particle geometry. Preferably, they are almost spherical, spheroid or acicular. The particle size in the case of spherical or spheroidal particles is from about 0.01 to 0.2 μm, for example from 0.02 to 0.04 μm. Acicular pigments have a length of from about 0.05 to 0.4 μm, for example 0.1 to 0.15 μm, and an axial ratio of from about 1:2 to 1:10, for example from 1:5 to 1:6. Processes for the preparation of such magnetically soft pigments are described in DE-A-26 42 383, DE-A-30 27 012, DE-A-44 27 821, JP 57-17 57 34 and DE-A-100 17 490, which are incorporated by reference herein in their entireties.

The lower layer furthermore can contain:

lubricants, for example fatty acids or fatty esters, fatty amides, silicone oils, fluorine-containing compounds or others. Particularly preferably, the lubricants used therein comprise a combination of the above-defined compounds of the formulae (A) and (B), for example in a weight ratio of (A) to (B) of from 80:20 to 20:80, in particular from about 60:40 to 40:60 or 50:50, conductivity-increasing additives, such as barium sulfate, nitrates or the abovementioned carbon blacks or graphite, crosslinking agents, for example polyisocyanate, surfactants, a large number of which are known from the prior art.

The mean dry thickness of this lower layer is from 0.5 to 10 μm, preferably from about 1.0 to 3 μm.

c. The Upper Magnetic Layer Applied to the Lower Layer

The upper thin magnetic recording layer contains at least one ferromagnetic pigment P2, preferably a metallic pigment or alloy pigment. These pigments contain, as main components, Fe, Ni and/or Co; and can further include Al, Si, S, Sc, Ti, V, Cr, Cu, Y, Mo, Pd, Rh, Ag, Sn, Sb, Te, Ba, Ta, W, Re, Au, Hg, Pb, Bi, La, Ce, Pr, Nd, P, Mn, Zn, Sr or B, individually or as a mixture. The pigments may have on the surface a protective covering for preventing oxidation or other harmful effects or for improving the dispersibility. Highly coercive ferromagnetic iron oxides, chromium dioxide and ferrites, such as barium ferrite, are furthermore suitable.

The metal powders and alloy powders are preferably acicular or spindle-like and have a BET surface area of from about 40 to 90 m$^2$/g. The axial length is not more than 200 nm and the axial ratio (longitudinal-to-transverse) is in the range from 2 to 20. The coercive force is at least 100 kA/m and the saturation magnetization is in the range of from at least 100 to 180 emu/g. The metal powder or alloy powder may contain a small amount of water or hydroxide as a nonmetallic fraction.

Barium ferrite is preferably lamellar with a mean particle size of from 20 to 120 nm and an axial ratio (longitudinal-to-transverse) of from 2 to 10.

It is essential for the invention that the upper layer comprises exclusively binders having a Tg of at least 50° C., preferably at least 60° C., and not more than 150° C., preferably not more than 80° C. Nonlimiting examples of such binders are: vinyl chloride/vinyl acetate copolymers, vinyl chloride copolymers, vinyl chloride/vinylidene chloride copolymers, vinyl chloride/acrylonitrile copolymers, acrylate/acrylonitrile copolymers, acrylate/vinylidene copolymers, acrylate/styrene copolymers, methacrylate/acrylonitrile copolymers, methacrylate/vinylidene chloride copolymers, methacrylate/styrene copolymers, urethane elastomers, nylon/silicone resins, nitrocellulose/polyamide resins, polyvinyl fluoride, vinylidene chloride/acrylonitrile copolymers, butadiene/acrylonitrile copolymers, polyamide, polybutyrals, cellulose derivatives, styrene/butadiene copolymers, polyester resins, chlorovinyl ether/acrylate copolymers, amine resins, phenoxy resins, epoxy resins, polyvinyl acetal resins and polyvinyl butyral resins. These binders may be used alone or in combination. The binders preferably contain polar groups for increasing the dispersing power; suitable polar groups are the groups described in section b for the binders of the lower nonmagnetic layer.

Furthermore, the upper magnetic layer may also contain one or more of the following nonmagnetic additives:

Carbon black particles, as described under section b;

At least one nonmagnetic pigment P3/P4, preferably metal oxides, as described under section b for the lower, nonmagnetic layer. These pigments have substantially two functions for the upper layer, substantially determined by their particle size. They should serve as spacers between the surface of the magnetic layer and the head. For this purpose, as discussed further above, the particle diameter of these pigments P3 is equal to or slightly greater than the dry thickness of the upper magnetic layer. It is then possible for them, in the calendering step which is carried out during the production of the magnetic recording medium and which will be described in more detail below, to be immersed in the lower layer just sufficiently deeply so that they subsequently just project slightly out of the upper layer, but without causing a sensitivity-reducing distance-related attenuation of the recording medium. The pigments P4, in particular metal oxides, which mechanically stabilize the upper layer can be present in this layer. These pigments advantageously have a smaller particle diameter than the dry thickness of the upper layer. The particle geometry of the pigments P3/P4 is preferably spheroidal or spherical or almost spherical. Pigments P3/P4 having a MOHS' hardness of at least 6 are particularly preferred, a preferred example of this being $Al_2O_3$. An almost spherical $\alpha\text{-FE}_2O_3$ is particularly advantageous. The weight ratio of the small to the large pigments is in the range from 20:80 to 80:20, e.g. from 60:40 to 40:60. The following ranges are preferably applicable to the ratio of mean particle diameter r to mean dry layer thickness d of the upper layer:

r(P3):d=from 1:1 to 1.5:1, in particular from 1.05:1 to 1.2:1 r(P4):d=from 0.1:1 to 1:1, in particular from 0.4:1 to 0.8:1.

Additives, such as surfactants, for increasing the conductivity, the plasticity, the crosslinking of the layer and the dispersing power and for reducing the surface tension. These additives have already been discussed in section b.

The additives mentioned under section b may also be used as lubricants. It is essential for the required mechanical properties of the novel magnetic recording medium that at least one combination of the abovementioned lubricants of the formulae A and B is used in the upper layer. These are preferably introduced in a concentration of from 0.2 to 10% by weight, based on the ferromagnetic powder. The weight ratio of the amount of the lubricant A to the amount of lubricant B can be chosen in the range from 20:80 to 80:20, e.g. from 60:40 to 40:60. Particularly preferred examples of compounds of the formula A are butoxyethyl stearate, butyldiethylene glycol stearate, butyldiethylene glycol palmitate, butoxyethyl palmitate and butylpropylene glycol stearate. Particular examples of compounds of the formula B are butyl stearate, isobutyl stearate, butyl palmitate, isobutyl palmitate, butyl myristate, isobutyl myristate, butyl laurate and isobutyl laurate. However, the invention is not limited to the use of the abovementioned specific compounds.

The mean dry thickness d of the upper magnetic layer is preferably in the range of not more than 0.5 μm, particularly preferably in the range of from 0.15 to 0.30 μm. Dry thicknesses which are too small result in a reduction in the saturation magnetization, while excessively large dry thicknesses of more than 0.5 μm are sufficient to cause a reduction in the recording density.

d. The Backing Coating Optionally Applied to the Substrate

If desired, a backing coating known substantially from the prior art can be applied to the other side of the substrate which faces away from the magnetic layer, for improving the mechanical properties of the novel recording medium. This backing coating generally has a dry thickness in the range of from 0.3 to 2.5 μm. This backing coating may have the following additives:

Binder, as described above

Carbon black

Crosslinking agent.

Production of Novel Recording Media

Dispersions are prepared in a manner known per se from the compulsory and optional components described above.

The process for the preparation of usable dispersions is known per se and comprises at least one kneading stage, one dispersing stage and, if required, one mixing stage, which may be provided before and after the preceding stages. The respective stages may each be composed of two or more operations. In the preparation of the composition, all starting materials, i.e., the ferromagnetic powder, the binders, the carbon blacks, the abrasives or supporting pigments, the antistatic agents, the lubricants, the wetting agents and the dispersants, and predominantly organic solvents can be added to the reactor right at the beginning of the process or later during the process. Examples of these are tetrahydrofuran, methyl ethyl ketone, cyclohexanone, dioxane, acetone, esters, such as butyl, ethyl or methyl acetate, ethyl lactate, glycol monoethyl ether acetate, glycol or aromatic hydrocarbons. These may be used individually or in combination.

The crosslinking agent and, if required, a crosslinking catalyst are preferably added after the end of the preparation of the dispersion.

After fine filtration through narrow-mesh filters having a size of not more than 5 μm, the dispersions are applied by means of a conventional coating apparatus at speeds in the conventional range, aligned in a magnetic field in the substantially longitudinal recording direction, dried, and then subjected to a calendering treatment and, if required, a further surface-smoothing treatment.

"Substantially longitudinally aligned" means that, although the magnetic particles are present oriented substantially in the recording direction in the plane of the layer, they may also be arranged so as to be oriented inclined to the plane of the layer.

For the production of the novel magnetic recording medium, coatings can be effected by bar coaters, blade coaters, knife coaters, extrusion coaters, reverse-roll coaters or combinations thereof. The two layers can be applied simultaneously by the wet/wet method or by the wet/dry method.

A blade coater having at least one outlet orifice, preferably two or more outlet orifices, which is disclosed in DE-A-195 04 930, which is incorporated by reference herein in its entirety, is particularly preferred for the production of the novel magnetic recording media. Also suitable is an extrusion coater having at least one outlet orifice, preferably two or more outlet orifices, for the dispersions, the edge or the air gap of a magnet being opposite to the orifices on the other side of the flexible substrate and the field lines of the magnet being substantially parallel to the running direction of the substrate. Such arrangements are disclosed in EP-B-0 654 165 or FR-A-2 734 500, which are incorporated by reference herein in their entireties.

After the coating, drying and calendering of the medium are effected. The calendering is carried out on conventional apparatus by passing the dried webs between heated and polished rolls, if required with the use of pressure and temperatures of from 25 to 100° C., preferably from 60 to 90° C. During this, the magnetic recording medium is calendered and compacted.

The magnetic recording medium thus obtained is slit into the desired form for use and subjected to the conventional electromagnetic and mechanical tests.

EXAMPLES

The examples which follow illustrate the invention but without restricting it thereto.

All particle sizes stated in the present description relate to mean particle sizes, for example mean values determined by dynamic light scattering.

Example 1
(All Quantity Data in Parts by Weight)

A nonmagnetic layer having the following composition was applied to a substrate consisting of polyethylene naphthalate and having a thickness of 6.2 μm:

| | |
|---|---|
| α-Fe$_2$O$_3$, BTE 56 m$^2$/g, 0.15 μm | 100 |
| Carbon black, BET 112 m$^2$/g | 15 |
| Polyvinyl chloride having polar OH$^-$ and SO$_3^-$ groups, Tg = 64° C. | 13 |
| Polyester/polyurethane, Tg = 45° C. | 16 |
| Polyisocyanate | 3 |
| Myristic acid | 1 |
| Stearic acid | 1 |
| Butoxyethoxyethyl stearate | 0.5 |
| Isobutyl stearate | 0.5 |
| Tetrahydrofuran | 220 |
| Dioxane | 220 |
| Cyclohexanone | 100 |

An upper magnetic layer having the following composition was applied to this layer:

| | |
|---|---|
| Metal pigment Fe/Al, Hc = 2390 Oe, needle length = 100 nm | 100 |
| Polyvinyl chloride having polar OH$^-$ and SO$_3^-$ groups, Tg = 64° C. | 15 |
| Stearic acid | 2 |
| Phosphoric ester | 1 |
| Carbon black, BET 112 m$^2$/g | 1.5 |
| Al$_2$O$_3$, particle size 0.30 μm | 3.8 |
| Al$_2$O$_3$, particle size 0.20 μm | 2.3 |
| Butoxyethoxyethyl stearate | 0.4 |
| Isobutyl stearate | 0.2 |
| Polyisocyanate | 3.2 |
| Tetrahydrofuran | 270 |
| Dioxane | 270 |
| Cyclohexanone | 100 |

The lower layer had a dry thickness of 1.3 μm after calendering and the upper layer had a dry thickness of 0.27 μm after calendering. The two layers were applied by simultaneous casting by means of a blade coater.

Example 2

The procedure was as in example 1, except that butoxyethoxyethyl stearate was replaced in each case by the same amounts of butoxyethoxyethyl palmitate, both in the lower and in the upper layer.

Example 3

The procedure was as in example 1, except that 3.8 parts of Al$_2$O$_3$ having a particle size of 0.40 μm instead of 0.30 μm were used in the upper layer; the layer thickness of the upper layer was 0.35 μm. The 2.3 parts of Al$_2$O$_3$ having a particle size of 0.20 μm were retained.

Example 4

The procedure was as in example 1, except that 50 parts of α-Fe$_2$O$_3$ having a BET value of 56 m$^2$/g were replaced by 50 parts of a magnetically soft pigment having a BET value of 104 m$^2$/g, a mean particle size of 0.028 μm and an Hc of 10 Oe in the lower layer.

Example 5

The procedure was as in example 1, except that the isobutyl stearate was replaced by the same amounts of isobutyl palmitate, both in the lower layer and in the upper layer.

Example 6

The procedure was as in example 1, except that a backing coating having the following composition was additionally applied to the back of the substrate, by means of a reverse-roll coater, in a dry thickness of 0.6 μm:

| | |
|---|---|
| Carbon black, BET value 60 m$^2$/g | 30 |
| Carbon black, BET value 200 m$^2$/g | 60 |
| Polyester/polyurethane | 50 |
| Tetrahydrofuran | 150 |
| Dioxane | 150 |

Comparative Example 1

The procedure was as in example 1, except that butoxyethoxyethyl stearate was not used in the upper layer.

Comparative Example 2

The procedure was as in example 1, except that the Al$_2$O$_3$ having a particle size of 0.30 μm was completely replaced by Al$_2$O$_3$ of particle size 0.2 μm in the upper layer.

Comparative Example 3

The procedure was as in example 1, except that the polyvinyl chloride having a Tg of 64° C. was replaced by the same amount of polyester/polyurethane having a Tg of 33° C. in the upper layer.

Comparative Example 4

The procedure was as in example 1, except that isobutyl stearate was not used in the upper layer.

The table below shows the results obtained with the magnetic recording media according to the examples (Examples 1–6 denoted as E1 to E6) and the comparative examples (Comparative Examples 1–4 denoted as CE1 to CE4), in particular output level in dB relative to the reference tape DVC Panasonic AJ-P 63 MP drop in output level at 40° C., 5% relative humidity head wear after passage of the recording medium for 250 hours brown stain formation after passage of the recording medium for 15 hours at 40° C. and 5% atmospheric humidity, rated qualitatively in steps: 0 (no deposition) to 6 (considerable deposition).

TABLE

| Medium according to | Output level | Drop in output level | Head wear in μm | Brown stain |
|---|---|---|---|---|
| E1 | 0.2 | 0.5 | 0.7 | 2 |
| E2 | 0.1 | 0.7 | 0.7 | 2 |
| E3 | −0.5 | 0.4 | 0.9 | 2 |
| E4 | −0.4 | 0.6 | 0.5 | 2 |
| E5 | −0.1 | 0.5 | 0.8 | 2 |
| E6 | 0.3 | 0.2 | 0.5 | 1 |
| CE1 | −0.1 | 3.5 | 1.8 | 4 |
| CE2 | 0.1 | 0.5 | 2.2 | 2 |
| CE3 | −0.5 | 4.5 | 0.7 | 6 |
| CE4 | −0.6 | 2.5 | 1.7 | 3 |

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

We claim:

1. A magnetic recording medium comprising:
   a) a substrate,
   b) at least one lower layer on said substrate, said at least one lower layer containing at least one binder in a binder matrix and at least one inorganic pigment, and
   c) at least one upper magnetic layer on said at least one lower layer, said at least one upper layer containing at least one magnetic pigment P2 and at least one binder in a binder matrix and at least one nonmagnetic pigment P3,
   (1) the binder matrix of the at least one upper magnetic layer comprising at least one binder, said at least one binder exclusively having a Tg of at least 50° C. and the binder matrix of the at least one lower layer containing at least one binder having a Tg<50 C.;
   (2) the at least one nonmagnetic pigment P3 of the at least one upper magnetic layer having a particle size which corresponds at least to the dry thickness of the upper magnetic layer; and
   (3) the upper magnetic layer containing at least one compound (A) and at least one compound (B), said at least one compound (A) comprising at least one compound of the following formula (A):

$R^1$—COO—$(R^3$—O$)_m$—$R^2$ (A)

where
   $R^1$ is a saturated or unsaturated, straight-chain or branched hydrocarbon radical of 11 to 22 carbon atoms;
   $R^2$ is a saturated or or unsaturated, straight-chain or branched hydrocarbon radical of 1 to 6 carbon atoms;
   $R^3$ is an alkylene radical of 1 to 4 carbon atoms; and
   m is an integer from 2 to 4;
   and said at least one compound (B) comprising at least one compound of the following formula (B):

$R^1$—COO—$R^4$ (B)

where
   $R^1$ is as defined above and
   $R^4$ is a saturated or mono-or polyunsaturated, straight-chain or branched hydrocarbon radical of 4 to 8 carbon atoms.

2. The magnetic recording medium as claimed in claim 1, wherein the at least one lower layer contains at least one compound (A) and at least one compound (B).

3. The magnetic recording medium as claimed in claim 2, wherein the binder matrix of the at least one upper layer comprises at least one of vinyl copolymers, phenol resins, acrylates, epoxy resins, cellulose resins, polyesters and polyurethanes.

4. The magnetic recording medium as claimed in claim 1, wherein the binder matrix of the at least one upper layer comprises at least one of vinyl copolymers, phenol resins, acrylates, epoxy resins, cellulose resins, polyesters and polyurethanes.

5. The magnetic recording medium as claimed in claim 1, wherein the binder matrix of the at least one lower layer contains at least one binder having a Tg of less than 50° C., which comprises at least one of polyurethanes, rubbers, vinyl polymers, phenol resins, acrylates, epoxy resins, cellulose resins, and polyesters.

6. The magnetic recording medium as claimed in claim 5, wherein the binder matrix of the at least one lower layer further comprises at least one binder having a Tg of at least 50° C., which comprises at least one of vinyl copolymers, phenol resins, acrylates, epoxy resins, cellulose resins, polyesters and polyurethanes.

7. The magnetic recording medium as claimed in claim 1, wherein at least one binder of the at least one upper layer contains polar groups in order to increase dispersing power.

8. The magnetic recording medium as claimed in claim 7, wherein the polar groups comprise —COOM,—SO$_3$M, O—SO$_3$M,—P(OM)$_2$, amino groups, ammonium groups, OH groups, SH groups and epoxy groups, wherein M is a hydrogen, alkali metal atom or anmmonium.

9. The magnetic recording medium as claimed in claim 1, wherein at least one binder of the at least one lower layer contains polar groups in order to increase dispersing power.

10. The magnetic recording medium as claimed in claim 9, wherein the polar groups comprise —COOM,—SO$_3$M, O—SO$_3$M,—P(OM)$_2$ amino groups, aminonium groups, OH groups, SH groups and epoxy groups, wherein M is a hydrogen, alkali metal atom or ammonium.

11. The magnetic recording medium as claimed in claim 1, wherein the compounds (A) and (B) in the at least one upper layer are contained in an amount in the range from about 0.2 to 10% by weight, based on the magnetic pigment.

12. The magnetic recording medium as claimed in claim 11, wherein the weight ratio of compound (A) to compound (B) in the at least one upper layer is in the range from 20:80 to 80:20.

13. The magnetic recording medium as claimed in claim 1, wherein the at least one inorganic pigment in the lower layer has a BET value of at least 40 m²/g.

14. The magnetic recording medium as claimed in claim 1, wherein the at least one upper layer further comprises a nonmagnetic pigment P4 having a particle size which is smaller than the dry thickness of the at least one lower layer.

15. The magnetic recording medium as claimed in claim 14, wherein the nonmagnetic pigments P3 and P4 of the at least one upper layer comprise at least one of metal oxides, metal carbonates, metal sulfates, metal nitrides, metal carbides and metal sulfides.

16. The magnetic recording medium as claimed in claim 15, wherein at least one of the pigment P3 and the pigment P4 is an $Al_2O_3$.

17. The magnetic recording medium as claimed in claim 14, wherein the pigment P3 having a larger particle size and the pigment P4 having a smaller particle size are contained in a weight ratio of pigment P3 to pigment P4 of from 80:20 to 20:80.

18. The magnetic recording medium as claimed in claim 1, wherein the at least one inorganic pigment of the at least one lower layer comprises at least one of metal oxides and carbon blacks.

19. The magnetic recording medium as claimed in claim 1, wherein the at least one magnetic pigment P2 in the at least one upper layer is a metal powder or an alloy powder, said metal powder or alloy powder having a coercive force of at least 100 kA/m.

20. The magnetic recording medium as claimed in claim 1, wherein the at least one magnetic pigment P2 of the upper layer is a highly coercive ferrite.

21. The magnetic recording medium as claimed in claim 20, wherein the ferrite is barium ferrite.

22. The magnetic recording medium as claimed in claim 20, wherein the coercive ferrite has a coercive force of at least 100 kA/m.

23. The magnetic recording medium as claimed in claim 1, wherein the at least one inorganic pigment in the lower layer comprises at least one of at least one nonmagnetic pigment P1 and at least one magnetically soft pigment P5 having a coercive force of less than 0.7 kA/m.

24. The magnetic recording medium as claimed in claim 1, wherein the compound (A) comprises butoxyethoxyethyl stearate.

25. The magnetic recording medium as claimed in claim 1, wherein the compound (B) comprises isobutyl stearate.

26. A process for the production of a magnetic recording medium as claimed in claim 1, wherein the at least one upper layer is applied to an already dry at least one lower layer present on the substrate; or the at least one upper layer is applied to a wet at least one lower layer present on the substrate, or wherein both layers are applied simultaneously to the substrate.

27. The process for the production of a magnetic recording medium as claimed in claim 26, wherein the medium is dried after application of the at least one upper magnetic layer and is then subjected to a calendering process with the use of pressure.

28. The process for the production of a magnetic recording medium as claimed in claim 27, wherein the calendering process is at an elevated temperature.

29. The magnetic recording medium as claimed in claim 1, wherein the binder matrix of the at least one upper magnetic layer comprises at least one binder having a Tg of at least 60° C.

30. The magnetic recording medium as claimed in claim 1, wherein the binder matrix of the at least one upper magnetic layer comprises at least one binder having a Tg of not more than 150° C.

31. The magnetic recording medium as claimed in claim 30, wherein the binder matrix of the at least one upper magnetic layer comprises at least one binder having a Tg of not more than 80° C.

* * * * *